US008930864B2

United States Patent
Sinha et al.

(10) Patent No.: US 8,930,864 B2
(45) Date of Patent: Jan. 6, 2015

(54) METHOD OF SHARING AND RE-USING TIMING MODELS IN A CHIP ACROSS MULTIPLE VOLTAGE DOMAINS

(71) Applicant: International Business Machines Corporation, Armonk, NY (US)

(72) Inventors: Debjit Sinha, Wappinger Falls, NY (US); Eric J. Fluhr, Round Rock, TX (US); Stephen G. Shuma, Underhill, VT (US); Natesan Venkateswaran, Hopewell Junction, NY (US); Chandramouli Visweswariah, Croton-on-Hudson, NY (US); Michael H. Wood, Hopewell Junction, NY (US); Vladimir Zolotov, Putnam Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/633,911

(22) Filed: Oct. 3, 2012

(65) Prior Publication Data

US 2014/0096100 A1 Apr. 3, 2014

(51) Int. Cl.
G06F 9/455 (2006.01)
G06F 17/50 (2006.01)

(52) U.S. Cl.
USPC ............ 716/108; 716/106; 716/107; 716/113

(58) Field of Classification Search
USPC ........................................................ 716/113
See application file for complete search history.

(56) References Cited

U.S. PATENT DOCUMENTS

| 7,111,260 | B2 | 9/2006 | Visweswariah | |
|---|---|---|---|---|
| 8,122,404 | B2 | 2/2012 | Sinha et al. | |
| 2005/0216872 | A1* | 9/2005 | Sung et al. | 716/5 |
| 2010/0293512 | A1* | 11/2010 | Buck et al. | 716/2 |
| 2011/0138347 | A1* | 6/2011 | Tetelbaum | 716/133 |
| 2011/0307853 | A1* | 12/2011 | Mano et al. | 716/113 |
| 2012/0117527 | A1 | 5/2012 | Hemmett et al. | |
| 2012/0246605 | A1* | 9/2012 | Kitaoka et al. | 716/113 |

OTHER PUBLICATIONS

"First-Order Incremental Block-Based Statistical Timing Analysis", C. Visweswariah, et al., DAC 2004; 6 pages.
"Timing Analysis With Nonseparable Statistical and Deterministic Variations", V. Zolotov, et al., DAC 2012 pp. 1061-1066.

* cited by examiner

Primary Examiner — Paul Dinh
Assistant Examiner — Bryce Aisaka
(74) Attorney, Agent, or Firm — Ira D. Blecker; H. Daniel Schnurmann

(57) ABSTRACT

A method and a system for timing analysis of a VLSI circuit or chip design considering manufacturing and environmental variations, where the design includes multiple instances of a gate or macro instantiated at more than one voltage domain by sharing and re-using abstracts. The timing analysis of the chip includes a macro abstract instantiated in a voltage domain different from the domain during abstract generation. Timing models are re-used across chip voltage domains or across chip designs. Moreover, a statistical timing analysis of a chip design takes into consideration the voltage domains wherein at least one timing abstract model generation time voltage domain condition differs from the macro instantiation domain in the chip. The invention further provides sharing and re-using the statistical timing models or abstracts.

19 Claims, 3 Drawing Sheets

METHOD OF SHARING AND RE-USING TIMING MODELS IN A CHIP ACROSS MULTIPLE VOLTAGE DOMAINS

FIELD OF THE INVENTION

The present invention relates to the field of Electronic Design Automation, and more particularly, to timing analysis of integrated circuit (IC) chips. Yet more particularly, it relates to timing analysis involving sharing and re-using timing models considering voltage domains in a chip while taking manufacturing and environmental variations into account.

BACKGROUND

Static timing analysis (STA) is one of the pillars for verifying digital Very Large Scale Integrated (VLSI) circuit designs, and is widely used to predict the performance of the designs. STA is often used on very large designs for which exhaustive timing analyses are impossible or impractical in view of the number of patterns required to perform the analysis. State of the art static timing analysis tools make it possible to model designs with multiple timing modes and multiple corners only in a single environment. STA furthermore verifies that a VLSI circuit design performs correctly at a required frequency before it is released for manufacturing. When performing an STA, the design is represented as a timing graph; the points in the design where timing information is desired constitute the nodes or timing points of this graph, while electrical or logic connections between these nodes are represented as timing arcs of the graph.

With modern chip manufacturing technology scaling minimum device feature sizes to sub 65 nanometers, VLSI designs are increasingly getting larger in terms of size and complexity. Current day Application Specific Integrated Circuit (ASIC) designs contain several million gates while microprocessor designs can contain upwards of one billion transistors. While circuit simulation based timing analysis is most accurate, it is also run-time intensive, and is not practical to use it in a timing flow where timing runs are made regularly during the design cycle of a large chip. In essence, static timing analysis of such large circuits as a single flattened design is run-time prohibitive.

The aforementioned considerations have led to the concept of design partitioning and hierarchical timing. A given circuit is partitioned into several components labeled cores or units, which can be further partitioned into macros. A macro can simply be a collection of several to several thousand transistors or gates interconnected via wires designed to perform a certain task in the chip. In the simplest case, a macro can refer to a logic gate (e.g., logic AND gate). Macros are typically timed using accurate timing analysis techniques, (e.g. using transistor level timing tools with circuit simulation type accuracy in the case of microprocessor designs), and is followed by the generation of timing abstract models that reflect in a simpler form the actual timing characteristic of the macros. The latter step is termed timing macro-modeling or abstraction. The generated abstract of a macro captures its timing characteristic by the use of slew and load dependent tables to model the timing behavior of the logic. Delays and output slews (or waveforms) of timing arcs near the primary inputs (PI) of the macro are characterized as functions of input slew, while delays and output-slews of arcs closer to the primary outputs (PO) are characterized as functions of an output load, and sometimes a combination of both. This allows the generated abstract model to be used in multiple boundary condition (PI and PO) settings (i.e., wherein the input slews and the output loads during abstract usage differ from values during the generation of the abstract). Timing abstraction can employ techniques to reduce the size of the timing graph by performing graph pruning and arc compression. These techniques can reduce the number of timing arcs to be timed at the next level of hierarchy significantly. At the parent level of hierarchy, macros are typically represented by abstracts.

The timing abstraction process can be performed in a hierarchical fashion. A unit comprising several macro abstracts can itself be abstracted and used at the parent (core or chip) level. For ease of notation, the term macro will be used to denote any circuit component being abstracted, even if a unit containing other abstracts is being abstracted. The hierarchical timing approach enables fast timing analysis and productivity at the parent level (termed chip level for ease of notation in the present invention), since the abstract models facilitate fast timing analysis and allow re-use. The benefits are significantly highlighted when multiple instances of a macro are present at the chip level since timing analysis of the multiple instances can use the same timing abstract model instead of more accurate models being used for each instance. Timing abstracts are often referred to as intellectual property (IP) timing models. The abstracts can be used across different chip designs that need the same functionality provided by the abstracted macro. Essentially, abstracts provide a mechanism for sharing the same timing model across multiple instances of a macro within a design as well as across designs, and are therefore highly desirable for design productivity.

The impact of process variability in modern day chip design and manufacturing is significant in terms of the timing performance of a given VLSI circuit design. In addition to process variability, environmental variations (e.g. variations in voltage and temperature) contribute to the uncertainty in the design timing characteristics. Statistical Static Timing Analysis (SSTA) has subsequently emerged as a solution to address these issues and assess the impact of variations during timing analysis and optimization. In SSTA, timing quantities like delays and slews are treated as random variables with known distributions. Each timing quantity can be sensitive to multiple global sources of variability which are labeled parameters (e.g. voltage, temperature, channel length, transistor width, voltage-threshold, dopant concentration, and the like). Mathematically, the set of global parameters is denoted as: $\{X_1, X_2, X_3, \ldots, X_n\}$. A commonly used linear canonical form representation of a statistical timing quantity T is the following.

$$T = t_0 + \sum_{i=1}^{n} t_i \Delta X_i \quad \text{(EQ. 1)}$$

In the model shown, $t_0$ represents the mean value of the timing quantity T and denotes the nominal value of T in the absence of variability. $t_i$ denotes the sensitivity of T to a variation $\Delta X_i$ of the global parameter $X_i$. To achieve commonality between parameters, $\Delta X_i$ is denotes in sigma units instead of absolute parameter units (e.g. degree Celsius for parameter temperature). Typically, a $-3$ to $+3$ sigma range denotes the range of parametric variation. By way of example, if the expected temperature variation is between 0 degree Celsius and 100 degrees Celsius, the range can be denoted as a 6 sigma spread wherein $-3$ sigma, $+3$ sigma, and the nominal value (0 sigma) of parameter temperature corresponds to 0° Celsius, 100° Celsius, and 50° Celsius, respectively. If a timing quantity (e.g., delay) changes by 24 picoseconds due to temperature going from −3 to +3 sigma, the sensitivity of the timing quantity is computed as (24/6) or 4 picoseconds per sigma.

The operation voltage (V) value for a device (transistor or gate) strongly impacts the timing characteristics of the device. Typically, a given gate delay is smaller at a higher operating voltage compared to a lower operating voltage. In addition, the operating voltage also impacts the sensitivity of other parameters. As a result, the sensitivity $t_i$ corresponding to a process parameter $X_i$ (e.g., dopant concentration) is a function of the parameter voltage (V) and can be denoted as $t_i(V)$. U.S. Application No. 2012/0117527 describes an approach to model the voltage dependence in $t_i(V)$ using a linear form: $(t_{i0}+t_{iV}\Delta V)$. The term $t_{i0}$ denotes a constant sensitivity of the timing quantity T to parameter $X_i$ at the nominal condition of voltage ($\Delta V$=0 sigma), while the term $t_{iV}$ denotes the cross-term sensitivity of T to both voltage and parameter $X_i$. In other words, $t_{iV}$ describes how the sensitivity of T to $X_i$ changes with a change in voltage $\Delta V$. Using the cited notation, the equation EQ. 1 can now be expressed as follows:

$$T = t_0 + t_V \Delta V + \sum_{i=1(X_i \neq V)}^{n} t_i \Delta X_i + \sum_{i=1(X_i \neq V)}^{n} t_{iV} \Delta X_i \Delta V \quad \text{(EQ. 2)}$$

During statistical abstraction, statistical timing quantities and their sensitivities to all the parameters (including sensitivity to voltage) are captured for all the arcs in the timing graph of the macro. Traditionally, the mean value and sensitivity of any timing quantity captured in the abstract to either V or any other process parameter $X_i$ is valid for the defined (sigma) range of chip operating voltage when the macro was abstracted. By way of an example, consider the statistical delay D of an arc inside a macro represented as follows:

$$D=10+2\Delta V+3\Delta X_1+0.4\Delta V\Delta X_1 \quad \text{(EQ. 3)}$$

In the aforementioned model, the delay is 10 units at the nominal corner of V and $X_i$, that is, $D(\Delta V=0, \Delta X_i=0)=10$. At a given $\Delta V$ value, for instance $\Delta V=+1$ sigma, the sensitivity of the delay to $\Delta X_i$ is $\{+3+(0.4\times 1)\}=3.4$ units per sigma. This suggests that a key assumption to using the delay model is to use the model where the voltage condition definitions are identical to the conditions when the macro was abstracted. By way of example, assuming that the nominal voltage condition when the macro was abstracted equals 1.05 volts, i.e., $\Delta V=0$ sigma corresponds to V=1.05 volts. Further, assuming that the lowest operating voltage is 0.65 volts corresponds to $\Delta V=+3$ sigmas, if the abstract is employed for another chip design where the nominal voltage is not 1.05 volts, the delay obtained from the abstract at the new nominal voltage (still 10 units) would be incorrect. Similarly, if the +3 sigma condition of the new design is not 0.65 volts, the sensitivity of delay to parameter $X_i$ will be incorrectly computed as 3.4 units per sigma. Subsequently, a statistical timing abstract can traditionally be used for multiple instances within a chip only if all of the instances are on the same voltage domain as the domain used during generation of the abstract. The same applies for re-using an abstract across chip designs. The term voltage domain hereinafter will be used interchangeably with voltage islands as well.

Two embodiments make use of statistical abstracts across voltage domains for the same macro instantiation. In a first embodiment, abstracts can be generated for a macro per voltage domain. By way of example, if a chip has 2 domains, namely Vdd with voltage range 0.7 volts to 1.3 volts, and Vio with range 1 volt to 1.1 volts, two abstracts would need to be generated for each macro in the chip that can be instantiated in both domains. The first embodiment displays multiple disadvantages including increased abstract generation time, higher abstract storage requirements, and the limitation that voltage domains for new designs where the macro can potentially be re-used cannot be known in advance.

In a second embodiment, a single statistical abstract can be used for all domains by adding pessimistic guard-bands or margins. This approach typically suffers from pessimism, potential optimism, and the limitation that enough guard-bands may not be present for new designs with new voltage domains where the same macro can be instantiated. The limitations prohibit timing abstract re-use across designs, and negatively impact design productivity.

Referring to FIG. 1, a block diagram illustrates the intent to use a common abstract of a given macro instantiated at different voltage domains within and across designs. The macro M is instantiated twice in two domains, namely domain Vdd and domain Vio within Design B and once in a new domain Vdd* within Design B. The potential use of a single timing abstract without pessimistic margins for each of these three instantiations would aid design productivity and avoid overheads of maintaining multiple abstracts per domain for a given macro.

In more complicated cases, a chip can contain multiple voltage domains that are correlated instead of being independent, i.e., the operating voltage on each domain does not change independently. When multiple instances of the same macro are present on the domains and a path or timing test exists between the instances, leveraging the interdependence between the domains is crucial for accurate timing analysis.

Referring to FIG. 2, a block diagram is illustrated to show the paths between abstracts instantiated on multiple domains within the chip, showing the complexity of timing analysis with abstracts and multiple voltage domains. By way of example, if all domains in the figure are perfectly correlated, timing analysis considering any domain at a high voltage condition must consider all other domains at their corresponding high voltage conditions. However, if the domains are independent, multiple combinations of voltage domain conditions for each domain must be considered to obtain the potentially critical condition for timing analysis.

Accordingly, a need exists for sharing and re-using timing models considering voltage domains and their interdependence while taking manufacturing and environmental variations into account during a timing analysis of integrated circuit (IC) chips.

SUMMARY

In one aspect, an embodiment of the present invention provides a method and a system for timing analysis of a VLSI circuit or chip design considering manufacturing and environmental variations, where the design contains multiple instances of a gate or macro instantiated at more than one voltage domain by sharing and re-using abstracts, and wherein the timing analysis of the chip containing the macro abstract can be instantiated in a voltage domain that differs from the domain during abstract generation.

In another aspect, an embodiment provides a method and a system for re-using timing models across within-chip voltage domains or across chip designs.

In a further aspect, an embodiment provides a method of statistical timing analysis of the chip design considering voltage domains in which at least one timing abstract models' generation time voltage domain conditions differs from the macro's instantiation domain within the chip.

In yet a further embodiment, a method is provided that includes: a) using a computer, computing timings of the macro employing the macro voltage parameterized statistical timing model, obtaining information of the at least one voltage domain for macro instantiation; b) obtaining information of voltage domain for the macro instantiation; c) dynamically updating results of the macro timing computations based on voltage domain conditions of the timing model and the voltage domain information of the macro instantiation; and d) using the updated timing results, performing the timing analysis of the IC chip design as part of design closure prior to manufacture.

These and other aspects, aspects and advantages of embodiments of the invention are achieved by a method and a system of dynamically mapping of statistical timing models based on the voltage domain definitions during abstract model generation and usage. The method facilitates using a common statistical abstract model for macro instances with the chip containing different voltage domains, as well as using the same abstract across chip designs where the macro can be instantiated at yet different voltage domains. This aids design productivity and faster design closure as well as reduced time to market of the chip design.

BRIEF DESCRIPTION OF DRAWINGS

The accompanying drawings, which are incorporated in and which constitute part of the specification, illustrate the presently preferred embodiments of the invention which, together with the general description given above and the detailed description of the preferred embodiments given below serve to explain the principles of the invention.

DETAILED DESCRIPTION

The present invention will now be described in greater detail by way of the following discussion with reference to the drawings that accompany the present application. It is observed that the drawings of the present application are provided for illustrative purposes only.

Figure 3:
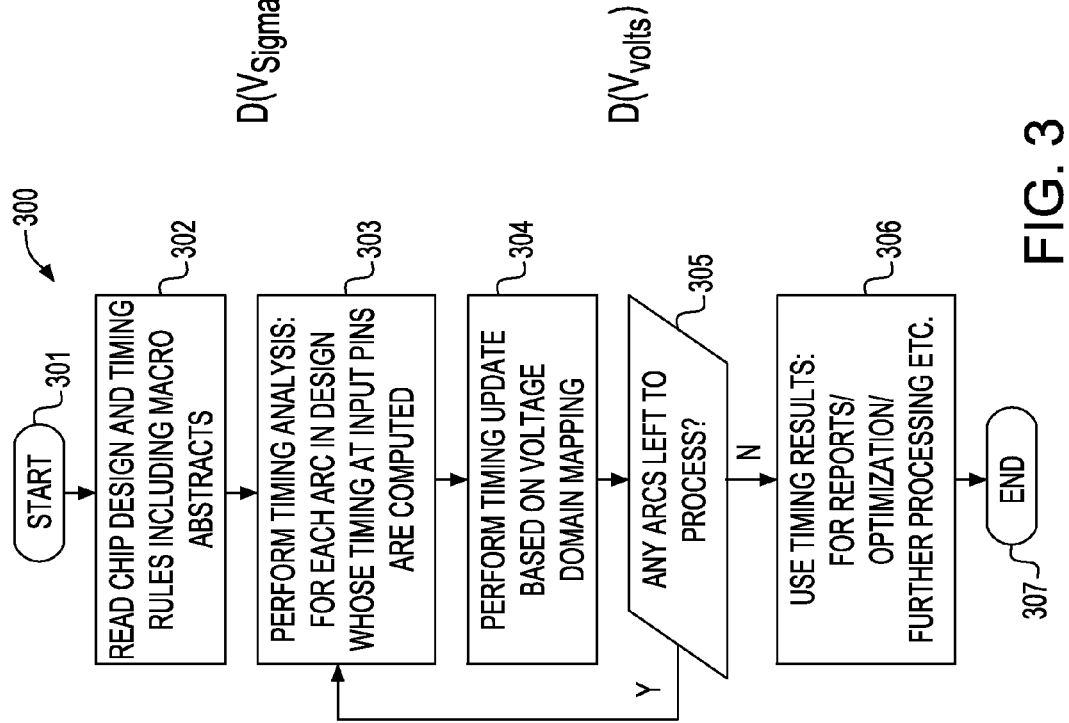
FIG. 3 is a flow diagram illustrating an embodiment of the timing analysis of a given VLSI circuit/chip design.

Referring to FIG. 3, there is shown a flow diagram illustrating one embodiment of a method 300 for timing analysis of a given VLSI circuit/chip design. The method 300 is initialized in step 301. In step 302, the design is read along with the statistical timing abstracts for all macros in the design. The design can contain non-abstracted logic components (gates) with original timing models. Timing models for macros (abstracts) and other logic gates are read in this step. Timing assertions for the circuit and other inputs needed for timing analysis can also be advantageously read in this step.

Referring to steps 303-305, the timing analysis of the circuit is performed next. Delays and slews are computed for all the arcs in the timing graph to compute the arrival times at all the timing points. In the case of a statistical timing analysis, timing quantities like delays and slews are represented as random variables with known distributions propagated throughout the timing graph. Required arrival times are propagated in a traditional manner and slacks are obtained at every timing point in the timing graph. This step can include traditional static timing analysis components like coupling analysis and common path pessimism reduction. Since the timing information of the macros are captured accurately as look-up tables in the abstract, timing analysis of the macros can be performed very efficiently.

Timing analysis involves computation of various timing quantities like delays and output slews (waveforms) for every timing arc in the timing graph model of the design in a topological fashion. In step 303, for each arc in the graph whose timing at the source pin is already computed, timing analysis is performed to compute the desired timing quantities corresponding to that arc. For illustrative purposes, a timing quantity T obtained as a result of this step is considered in the following canonical form:

$$T = t_0 + t_V \Delta V + \sum_{i=1(X_i \neq V)}^{n} t_i \Delta X_i + \sum_{i=1(X_i \neq Y)}^{n} t_{iV} \Delta X_i \Delta V \quad \text{(EQ. 4)}$$

In step 304, each timing quantity obtained resulting from step 303 is conditionally updated based on voltage domain mappings. There are three fundamental cases of voltage domain mappings. Embodiments for voltage domain mappings for these cases are illustrated for simplicity using the model in EQ. 4 without limiting the scope of the embodiments of the invention. It is assumed that the (abstract) timing model of the arc was generated for a voltage domain with a certain voltage range that maps to voltage sigma range ($S_L$, $S_H$) based on a global voltage sigma mapping reference.

Case I: If the voltage domain corresponding to the arc being timed in step 303 matches the domain definition of the timing model (e.g. timing abstract), no updates are required. The input timing quantity T is returned as the final timing quantity in the absence of voltage domain mappings.

$$T_{out} = T = t_0 + t_V \Delta V + \sum_{i=1(X_i \neq V)}^{n} t_i \Delta X_i + \sum_{i=1(X_i \neq V)}^{n} t_{iV} \Delta X_i \Delta V \quad \text{(EQ. 5)}$$

Case II: If the voltage domain corresponding to an arc being timed does not have a voltage variation range, but is at a fixed voltage that corresponds to a sigma of $S_0$ with reference to the range ($S_L$, $S_H$), the voltage dependence of the timing quantity is removed following proper adjustments to the mean and sensitivities of other parameters that are voltage dependent (i.e., having cross terms). During the process, each $\Delta V$ variable in T is substituted with a known fixed value of $\Delta V = S_0$. Using the example in EQ. 4, T is updated as follows:

$$T_{out} = T(\Delta V = S_0) = t_{0S_0} + \sum_{i=1(X_i \neq V)}^{n} t_{iS_0} \Delta X_i \quad \text{(EQ. 6)}$$

where, $$t_{0S_0} = t_0 + t_V S_0$$

$$t_{iS_0} = t_i + t_{iV} S_0$$

The updated timing quantity $T_{out}$ shows no sensitivity to parameter voltage. In addition, sensitivities of $T_{out}$ to other parameters that were voltage dependent are no longer voltage dependent.

Case III: If the voltage domain corresponding to the arc being timed has a different voltage domain mapping (corresponding to parameter $V^{out}$) than that of the timing model, the timing quantity T necessitates to be updated. For illustration, it is assumed that the domain corresponding to the arc has a voltage range that corresponds to the sigma range $(S_1, S_2)$ with respect to the global reference. It is further assumed that the range is denoted as a sigma range $(S_{L*}, S_{H*})$ which obviously does not match the global reference. Such a scenario is possible when the abstract is being re-used in another design with completely different voltage sigma mappings, or when the same macro is being instantiated in multiple voltage domains within the same design. For the present mapping, the mean and sensitivities of $T_{out}$ are computed such that $T_{out}(\Delta V^{out}=S_{L*})$ matches $T(\Delta V=S_1)$ and $T_{out}(\Delta V^{out}=S_{H*})$ matches $T(\Delta V=S_2)$. Using the example in EQ. 4 for illustration, $T_{out}$ is computed as follows:

$$\Rightarrow t_0^{out} + t_V^{out} S_{L*} = t_0 + t_V S_1 \text{ and } t_0^{out} + t_V^{out} S_{H*} = t_0 + t_V S_2 \quad (EQ. 7)$$

$$\Rightarrow t_0^{out} = \frac{t_0(S_{H*} - S_{L*}) + t_V(S_1 S_{H*} - S_2 S_{L*})}{(S_{H*} - S_{L*})} =$$

$$t_0 + \frac{t_V(S_1 S_{H*} - S_2 S_{L*})}{(S_{H*} - S_{L*})}$$

$$\Rightarrow t_V^{out} = \frac{t_V(S_1 - S_2)}{(S_{L*} - S_{H*})}$$

$$\Rightarrow t_i^{out} + t_{iV}^{out} S_{L*} = t_i + t_{iV} S_1 \text{ and } t_i^{out} + t_{iV}^{out} S_{H*} = t_i + t_{iV} S_2$$

$$\Rightarrow t_i^{out} = \frac{t_i(S_{H*} - S_{L*}) + t_{iV}(S_1 S_{H*} - S_2 S_{L*})}{(S_{H*} - S_{L*})} =$$

$$t_i + \frac{t_{iV}(S_1 S_{H*} - S_2 S_{L*})}{(S_{H*} - S_{L*})}$$

$$\Rightarrow t_{iV}^{out} = \frac{t_{iV}(S_1 - S_2)}{(S_{L*} - S_{H*})}$$

If the voltage domain corresponding to the arc (parameter $V^{out}$) is in synchronism with an existing voltage domain (parameter V) whose mapping corresponds to that of the abstract model, $V^{out}$ can be replaced with V in $T_{out}$. However, for an independent domain, $T_{out}$ is no longer dependent on parameter V, but depends on parameter $V^{out}$. If it is desired that other process parameters not be dependent on $V^{out}$ either for modeling simplicity or for reasons including that the range of $V^{out}$ be small, approximations can be performed to remove the dependence (cross terms) of $V^{out}$ from other parameter sensitivities of $T_{out}$.

In step 305, it is verified whether any arcs are left for timing analysis. Each of such arcs is timed using steps 303 and 304. Once all the arcs are timed, and the timing analysis for the graph is complete, the overall timing results are used in step 306 optionally for various steps like timing report generation and timing optimization. If required, steps 303-306 can be performed several times. The method 300 terminates in step 307.

It is not required that statistical static timing analysis be performed in the method 300. Deterministic corner based timing can be performed using statistical abstract timing models, and the present invention applies to such scenarios as well.

In another embodiment, voltage to voltage sigma mappings are required for mapping timing quantities that are obtained from a timing model at a voltage domain to the voltage domain during instantiation of a macro using that model. While linear mapping and linear interpolation can be performed for the same, the inherent non-linear impact of voltage on timing characteristics can introduce inaccuracies when used with a linear statistical timing model as in EQ. 4. Non-linear mappings can be performed for a given semiconductor technology or a class of VLSI designs and stored in a form that can either be looked up or efficiently computed during mappings.

Figure 1:
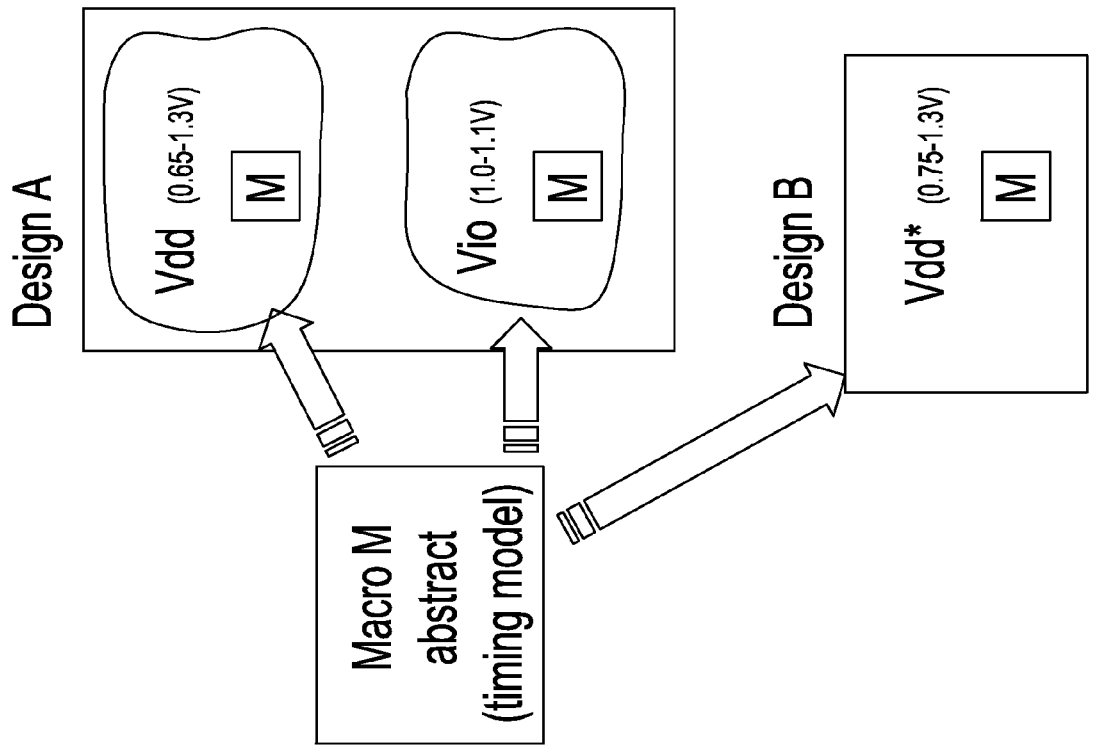
FIG. 1 is a block diagram illustrating a prior art use of a common abstract for a given macro instantiated at different voltage domains within and across designs.
Figure 2:
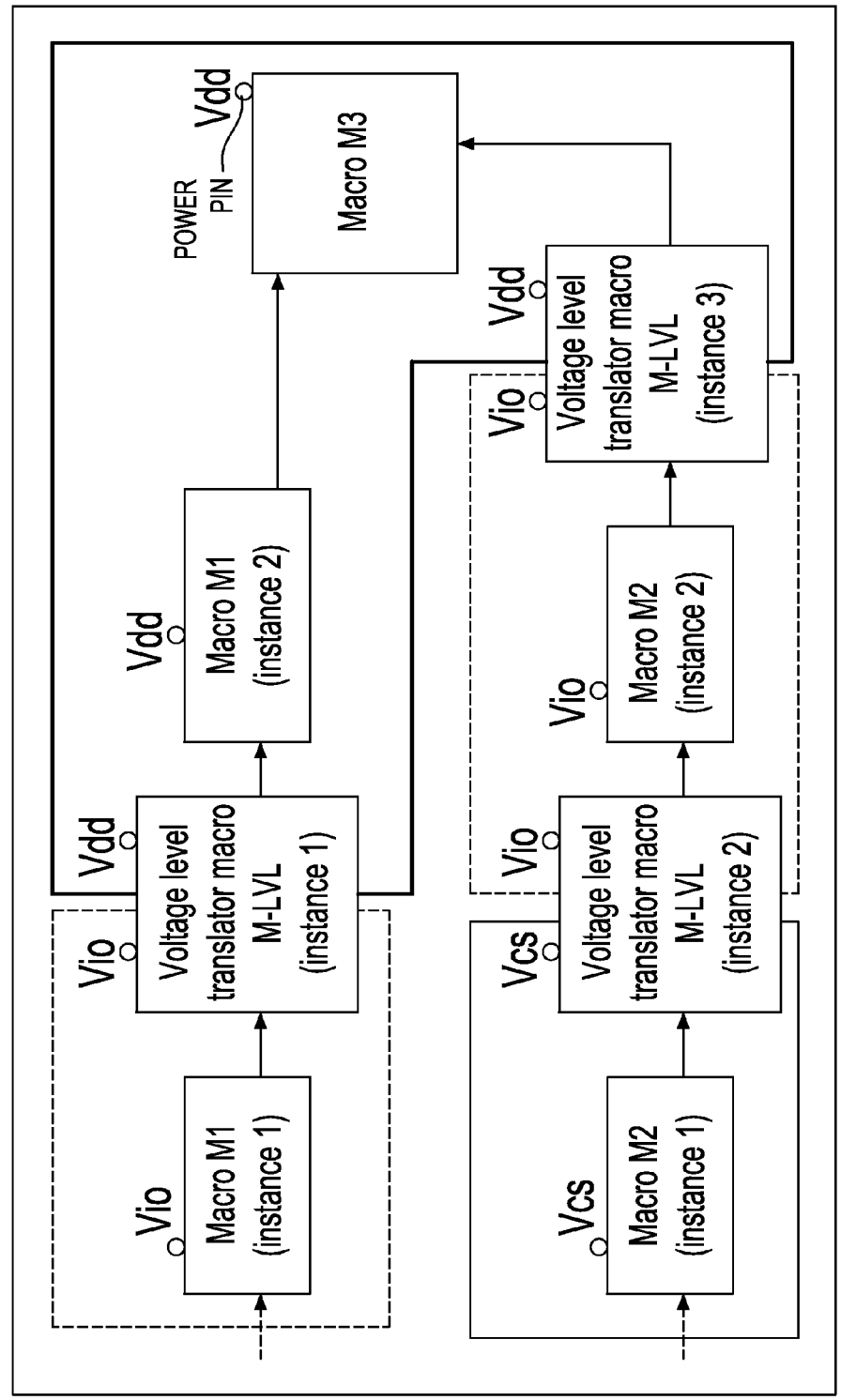
FIG. 2 is a block diagram illustrating the paths between abstracts instantiated on multiple domains within the chip, and further illustrates the complexity of the timing analysis including abstracts and multiple voltage domains.
Figure 4:
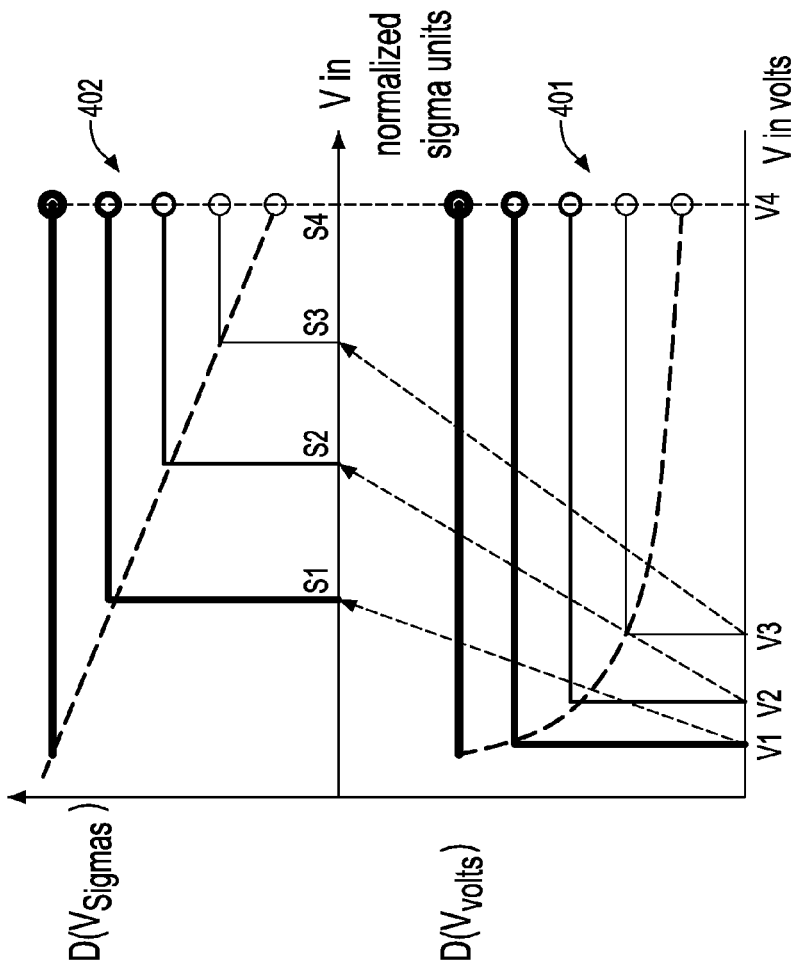
FIG. 4 shows the dependence of a timing quantity such as delay on voltage, and depicts the delay dependence as a function of the voltage, while illustrating a non-linear dependence.

FIG. 4 illustrates the dependence on voltage of a timing quantity (e.g. delay represented by D). Plot 401 shows the delay dependence as a function of voltage in absolute volts units and illustrates a non-linear dependence. Given delay values at voltage conditions of V1 and V4, attempting to obtain the delay at V2 using a linear interpolation would lead to inaccuracies. Such interpolations are required during voltage domain mappings, wherein the instantiated domain of a macro differs from that of the timing model, and where new voltage sigma values are required for the domain mapping. A linear interpolation to obtain new sigma values, followed by computing a delay based on the interpolated sigmas can cause inaccuracies. To alleviate the problem, the entire voltage range (V1 through V4 in FIG. 4) is mapped to a sigma range, as shown in plot 402. Mapping is preferably done in a non-linear fashion such that a linear interpolation in the voltage sigma space yields accurate delay results. The voltage to sigma mapping can be stored as a table or a function. As an example, to obtain the delay corresponding to V2, a voltage to voltage sigma lookup is performed to first obtain the sigma range S1 and S4, and the desired value S2. To compute the delay, a linear interpolation can now be performed in the delay and voltage sigma space to accurately obtain the delay at S2 (corresponding to V2). Voltage to voltage sigma mappings can also be stored separately for various timing quantities like delay, slew, and different parameter sensitivities. They can even be stored separately in accordance to different logic gate types.

It should be noted that although not explicitly specified, one or more steps of the methods described herein can include a storing, displaying and/or outputting step as required for a particular application. In other words, any data, records, fields, and/or intermediate results discussed in the methods can be stored, displayed, and/or outputted to another device as required for a particular application. Furthermore, steps or blocks in the accompanying figures that recite a determining operation or involve a decision, do not necessarily require that both branches of the determining operation be practiced. In other words, one of the branches of the determining operation can be deemed as an optional step.

While the foregoing is directed to embodiments of the present invention, other and further embodiments of the invention can be devised without departing from the basic scope thereof. Various embodiments presented herein, or portions thereof, can be combined to create further embodiments.

What is claimed is:

1. A method for sharing and re-using a single voltage parameterized statistical timing model corresponding to a macro during timing analysis of an integrated circuit (IC) chip design provided with at least one voltage domain and at least one instance of the macro, the method comprising:
   a) using a computer, computing timings of said macro employing said macro single voltage parameterized statistical timing model;
   b) obtaining information of voltage domain for macro instantiation;

c) comparing said voltage domain information of said macro instantiation with a voltage domain information of said single voltage parameterized statistical timing model to detect a voltage domain information mismatch;

d) generating a self-correction transformation upon discovery of said voltage domain information mismatch that dynamically updates said single voltage parameterized statistical timing model to correspond to said voltage domain of said macro instantiation;

e) dynamically updating results of said macro's said computed timings based on said dynamically updated statistical timing model; and f) using said updated timing results, performing said timing analysis of said IC chip design.

2. The method of claim 1, wherein in step f), said performing said timing analysis is a statistical timing analysis.

3. The method of claim 1, wherein in step f), said performing said timing analysis is a deterministic corner based timing analysis.

4. The method of claim 1, wherein said macro is instantiated at least once in said IC chip design at said one voltage domain corresponding to a fixed voltage.

5. The method of claim 1, wherein said macro is instantiated at least once in said IC chip design at said one voltage domain corresponding to a voltage range that differs from that of said single voltage parameterized statistical timing model.

6. The method of claim 1, wherein said macro is instantiated at least once in said IC chip design at said one voltage domain that is correlated with the voltage domain definition of said single voltage parameterized statistical timing model.

7. The method of claim 1, wherein said macro is instantiated at least once in said chip design at said one voltage domain that varies independently from the voltage domain definition of said single voltage parameterized statistical timing model.

8. The method of claim 1, wherein said statistical timing model comprises additional parameter sensitivities that are voltage dependent.

9. The method of claim 8, wherein said dynamically updating the results of said timing analysis of said macro based on voltage domain conditions of said timing model updates additional parameter sensitivities that are voltage dependent.

10. The method of claim 1 further comprising performing in step a) timing calculations for said macro executed for a timing point at a time.

11. The method of claim 1, further comprising performing in step a) timing calculations for said macro performed for a timing arc at a time.

12. The method of claim 1, wherein results of said timing calculations comprise timing quantities consisting of delays, slews, waveforms, test guard-times, timing assertions, and sensitivities.

13. The method of claim 1, wherein non-linear voltage mapping is performed for said dynamically updating the results of said timing calculations of said macro based on voltage domain conditions of said timing model.

14. The method of claim 1, wherein statistical abstraction of said IC design is performed following said timing analysis of said IC design to generate a statistical timing abstract.

15. The method of claim 14, wherein said IC design comprises only one of said macros to generate said statistical timing abstract of said macro at a new voltage domain condition.

16. The method of claim 14, wherein said statistical timing abstract model further comprises bilinear non-separable canonical forms for characterized timing quantities.

17. The method of claim 16, wherein during an instantiation of said generated statistical timing abstract, depending on a connected voltage domain, intrinsic value and parameter sensitivities of timing quantities are dynamically updated to reflect correct values corresponding to said domain.

18. The method of claim 1 further comprising ensuring timing of a hierarchical design with IP blocks at different domains are performed accurately without using pessimistic guard-bands, while keeping only a single statistical timing model or abstract for the IP.

19. A non-transitory program storage device readable by a machine, tangibly embodying a program of instructions executable by the machine to, perform method steps for sharing and re-using a single voltage parameterized statistical timing model corresponding to a macro during timing analysis of an integrated circuit (IC) chip design provided with at least one voltage domain and at least one instance of the macro, the method comprising:

a) using a computer, computing timings of said macro employing said macro's single voltage parameterized statistical timing model;

b) obtaining information of voltage domain for macro instantiation;

c) comparing said voltage domain information of said macro instantiation with a voltage domain information of said single voltage parameterized statistical timing model, to detect a voltage domain information mismatch;

d) generating a self-correction transformation upon discovery of said voltage domain information mismatch that dynamically updates said single voltage parameterized statistical timing model to correspond to said voltage domain of said macro instantiation; and e) dynamically updating results of said macro's said computed timings based on said dynamically updated statistical timing model; and f) using said updated timing results, performing said timing analysis of said IC chip design.

* * * * *